United States Patent

[11] 3,586,763

[72] Inventor Hans-Dieter Schneider
Gross-Gerau, Germany
[21] Appl. No. 799,386
[22] Filed Feb. 14, 1969
[45] Patented June 22, 1971
[73] Assignee Fernseh G.m.b.H.
Darmstadt, Germany
[32] Priority Feb. 14, 1968
[33] Germany
[31] P 15 37 940.5

[54] BEAM SPLITTING MEANS FOR COLOR TELEVISION CAMERAS
10 Claims, 4 Drawing Figs.

[52] U.S. Cl. .......... 178/5.4 TC
[51] Int. Cl. .......... H04n 9/08
[50] Field of Search .......... 178/5.4 TC, 5.4

[56] References Cited
UNITED STATES PATENTS

| | | | |
|---|---|---|---|
| 2,969,424 | 1/1961 | Tait | 178/5.4 (4TCC) |
| 3,272,916 | 9/1966 | James et al. | 178/5.4 (4TCC) |
| 3,281,528 | 10/1966 | James | 178/5.4 (4TCC) |

*Primary Examiner*—Robert L. Griffin
*Assistant Examiner*—Richard P. Lange
*Attorney*—Michael S. Striker

ABSTRACT: An optical beam splitting arrangement for use with color television cameras, A luminance channel transmits a signal for a luminance image of substantially high resolution. The luminance image signal is applied to one input of a differential amplifier. The other input to the differential amplifier is derived from covering image channels of substantially lower resolution. The arrangement is such that the luminance characteristic is made substantially identical to the theoretically correct characteristic while, at the same time, realizing a contour enhancement.

Inventor:

Hans-Dieter Schneider by

Attorney

BEAM SPLITTING MEANS FOR COLOR TELEVISION CAMERAS

BACKGROUND OF THE INVENTION

The present invention resides in a beam splitting system of a color television camera in which the light originating from the object to be picked up by the camera is distributed onto a number of photocathodes of television pickup tubes. One of these pickup tubes serves to produce brightness or intensity pictures or images, whereas the others are designed to produce color component images or registration images.

A color television camera of the preceding species is with separate brightness or luminance channel and in the form of, for example, a four-tube camera with three color pickup tubes for red, blue and green, and a luminance pickup tube. In such a color television camera, it is required that, for correct brightness transmission of the gray stages in the luminance channel, the filter curve of the beam splitting filter be neutral. This beam splitting filter separates or extracts the light from which the luminance signal is derived. If this requirement is not met, a correction filter is used between the beam splitting filter and the luminance tube for the purpose of matching as well as possible the luminance signal to the sensitivity curve of the human eye.

It has been found in the conventional color splitting arrangements that color tubes provide or transmit different energy contributions as a result of their different spectral sensitivity. In view of that condition, the pickup tube for the green channel is preferentially treated because the sensitivity of its photocathode is largest. Such preference is undesired, since when using plumbicon tubes, as is the conventional practice today, it is necessary to provide arrangements so that the signal currents in the color channels are as identical as possible. This requirement arises from the appearance of persistencies in the plumbicon tubes and is applied to avoid color fringes in the transmission of movable objects. To fulfill or to meet this requirement, an absorption filter was introduced in front of the pickup tube of the green channel. This, however, results in light losses which are basically undersired, since the light sensitivity of the camera is thereby affected in a disadvantageous manner. Accordingly, it is the object of the present invention to provide an improved camera with an improved beam splitting system. It is the object of the present invention to thereby realize higher sensitivity since the light losses are avoided.

In carrying out the process, in accordance with the present invention, the beam splitting filter in which the light is split into a luminance channel, on one hand, and the chrominance channels, on the other hand, is not of the neutral design. Instead, this beam splitter is designed to be of the chromatic type. Thus, in the beam splitter of the present invention, a portion of the incident light within a predetermined spectral region reaches preferentially the luminance channel, while the light transmitted to the color channels is correspondingly attenuated. The attenuation is selected such that the output signal of the pickup tube for the green channel is dropped or attenuated to the level of the red or blue channel or their average value. With this arrangement, a light attenuation or weakening filter in the green channel is no longer required, and the luminance channel receives additional energy.

An enhancement of a color portion of the luminance channel is, however, not permissible, since correspondingly colored objects being picked up will be produced too bright in a black and white picture. This error is, however, avoided through a novel concept in a further development of the present invention, which also produces an additional advantage. In this concept, the luminance signal has subtracted from it the signal of that channel which is associated with the color value that was enhanced in the luminance channel. The amount subtracted is made such that the prescribed characteristics of the luminance signal are reproduced. In this manner, the falsification of the gray value in the luminance channel is removed. The additional advantage in the use of this concept resides in that an aperture correction is realized through the subtraction of the signal with small bandwidth from the luminance signal with larger bandwidth. Through this subtraction the resulting signal function has the effect of an aperture correction in view of its Fourier spectrum. Thus, the advantage of the present invention does not reside only in the realization of larger signal amplitude, but also in an improved edge sharpness.

The improvement of the properties of the color camera of the aforementioned types is, therefore, achieved in accordance with the present invention by subtracting from the signal of the luminance picture with higher resolution, the signal of one or more covering pictures of lower resolution. The subtraction is carried out such that the spectral signal characteristics of the luminance channel become close to the theoretically correct value and, at the same time, a contour approximation is achieved.

In accordance with a further development of the present invention, the luminance curve is deviated from the theoretically correct curve so that in the beam splitting system, the deviation corresponds approximately to the transmission curve of the green channel. This deviation is then used as a correction channel for the green signal.

The prescribed lower resolution of the covering or registration images can be advantageously set or adjusted by optical and/or electrical defocusing.

SUMMARY OF THE INVENTION

A beam splitting arrangement for use in color television cameras. The signal derived from the luminance channel corresponding to a luminance image of substantially high resolution is applied to one input of a differential amplifier. The other input of this differential amplifier is derived from a channel associated with covering images of relatively lower resolution. The differential amplifiers subtracts the signal of the covering images of lower resolution from the signal of the luminance image with higher resolution. The arrangement is such that the spectral luminance characteristics become approximately identical to the theoretically correct characteristics while, at the same time, achieving a contour enhancement. By means of voltage dividers, it is possible to subtract more or less of the signals from the covering images, from the signal derived from the luminance channel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
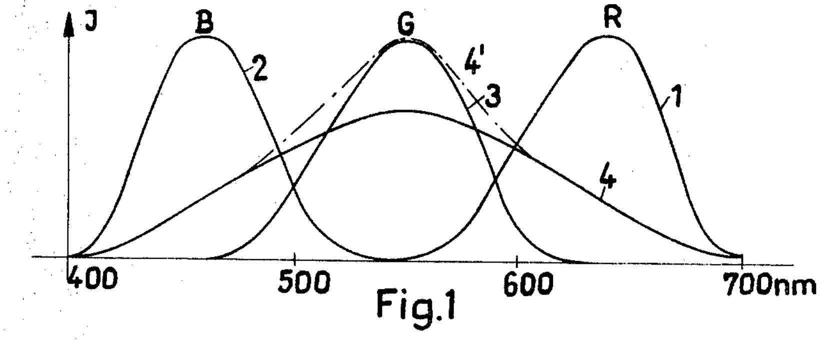
FIG. 1 is a graphical representation of the spectral characteristics of the beam splitting filter, in accordance with the present invention.

Referring to the drawing, and in particular to FIG. 1, the latter is a spectral diagram of the transmission curves of the beam splitting filter. The wavelengths of light are plotted along the abscissa in units of *n*M, whereas the intensity is plotted along the ordinate. The curve designated by the reference numeral 1 represents the spectral distribution of the light which reaches the red channel, whereas the curve designated by the reference numeral 2 is a plot of the light intensity as a function of wavelength reaching the blue channel.

Similarly, the curve 3 corresponds to the light reaching the green channel. The extended or drawn-out curve 4 represents the spectral distribution of the light entering the luminance channel, as determined by the laws of colorimetry.

To improve the properties of the color television camera, the light flux reaching the luminance tube is supplemented by an additional component of green light. As a result of this procedure, the spectral sensitivity curve 4' is obtained. To achieve this result, the luminance filter of this color splitter is designed as a chromatic, and is not in neutral form as previously.

Figures 2A, 2B, 3:
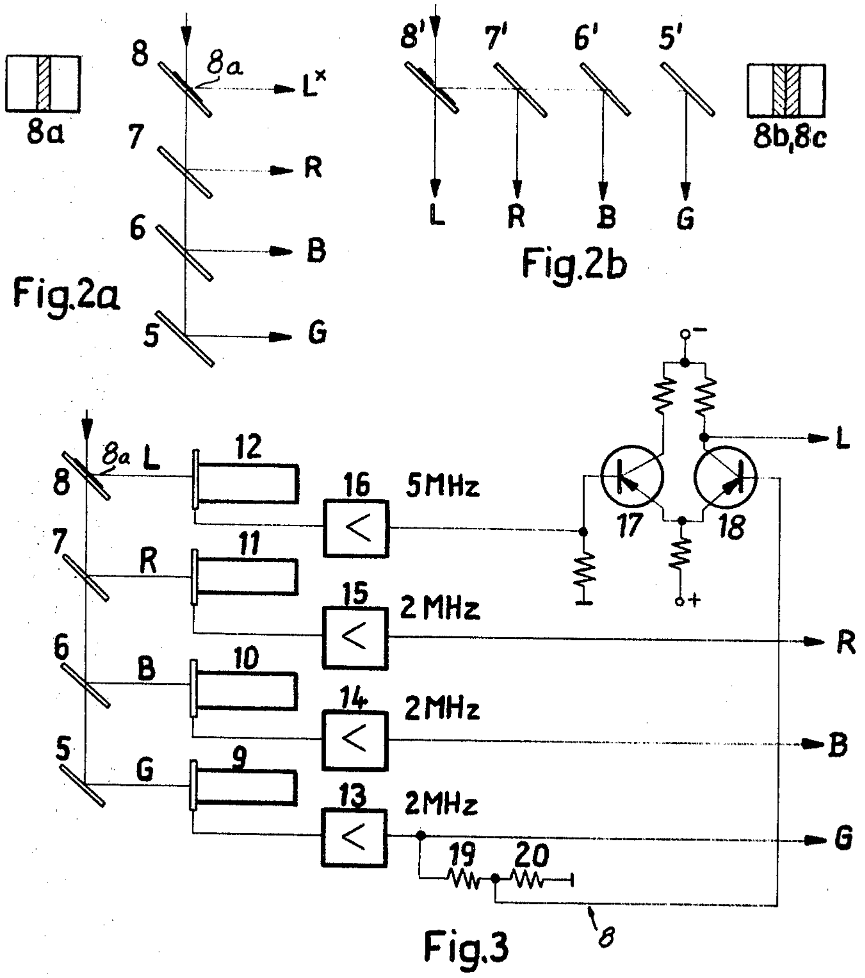
FIGS. 2*a* and 2*b* are schematic diagrams and show two embodiments of the beam splitter of the present invention.
FIG. 3 is a functional schematic diagram of the color television camera operating in conjunction with the beam splitting arrangement of the present invention.

FIG. 2 shows two embodiments of the present invention. FIG. 2*a* shows beam splitting filters 6, 7 and 8 of the beam splitter of a four-tube camera. The light entering in the direction of the vertical arrow shown in FIG. 2*a*, is split into the light beams L, R, B and G. The mirror 5 is a simple deflection mirror. For the purpose of realizing chromatic light splitting of the splitter 8, the latter has applied to it a strip 8*a*. This strip is applied to the splitter as shown in the adjacently located rectangular diagram. In the normal or usual situation, the splitter 8 is of neutral reflectivity. The strip 8*a* is designed to reflect green light preferably. This green light reaches the luminance channel so that the distribution curve 4' of FIG. 1 is realized. The branched-off green light is, of course, missing in the green channel which receives the remaining light beams R and B for red and blue, respectively, which are branched off through the filter 7 and 6.

The chromatic deviation of the luminance filter can also be achieved in accordance with the arrangement of FIG. 2*b*. In this arrangement, the additional light is transmitted to the red and blue channels. The luminance channel does not, in this case, receive the reflected light from the luminance splitter. Instead, the luminance channel receives the transmitted light. For this purpose the luminance splitter 8 has applied to it the strips 8*b* and 8*c* which have the same properties as the coating of the splitters 7' and 6'. The advantage of this embodiment resides in the condition that the interference layers on the luminance splitter 8' may be identical with those upon the splitters 7' and 6'. These interference layers serve to deviate a color light beam. The interference layers provided on the luminance splitters do not disturb or interfere with the transmitted television picture. Such disturbing effects do not prevail since the filter plane is not sharply focused or imaged by the relay optical system situated between the filters, but not shown in the drawing because it is well known in the art.

FIG. 3 shows a practical embodiment of the camera arrangement of the present invention. A color splitting system is provided in accordance with FIG. 2*a* through the elements 5, 6, 7 and 8. In the arrangement of FIG. 2*a*, the split beam L* represents the luminance signal with green enhancement, whereas the split beams R, B and G denote red, blue and green light beams, respectively. These split beams L*, R, B and G are applied to the pickup tubes 12, 11, 10 and 9, respectively, by way of relay optical systems not shown. The received picture or video signals are amplified within the amplifier 16, 15, 14 and 13, respectively. The amplifier 16 has a bandwidth of 5 MHz., whereas the remaining amplifiers have a bandwidth of 2 MHz. For the purpose of realizing the desired or theoretically correct luminance signal, a voltage divider composed of resistors 19 and 20, is provided at the output of the amplifier 13. The resistors 19 and 20 are connected in series with a tap or junction between them. One terminal of the resistor 19 is connected to the output of the amplifier 13, whereas the free terminal of the resistor 20 is connected to ground potential. The junction or tap of the voltage divider, representing the divided voltage of the output of the amplifier 13, is applied to the base of a transistor 18. The transistor 18 cooperates with an additional transistor 17 to form a differential amplifier of the conventional type. Thus, the emitters of transistors 17 and 18 have a common emitter resistor, whereas the collectors of these two transistors lead to a negative reference voltage supply. The base of the transistor 17 forms the other input to the differential amplifier, and is connected to the output of the amplifier 16. By selecting the magnitudes of the resistors 19 and 20 relative to each other in a predetermined manner, the voltage or potential applied to the base of the transistor 18 may be selectively varied or scaled so that a predetermined potential results at the base of this transistor 18. As a result, the green signal may be extracted from the luminance signal at a magnitude such that the luminance signal attains a color characteristic of the form described above. Thus, the difference or differential amplifier 17, 18 subtracts the green signal as derived from the output of amplifier 13, from the luminance signal derived from the output of the amplifier 16. Through specific choice of the relative magnitudes of the resistors 19 and 20, by varying the relative magnitudes of these two resistors, the voltage applied to the base of transistor 18 is correspondingly varied. Therefore, by the correct choice of the two resistors of the voltage divider 19,20, the correct potential may be applied to be base of transistor 18, so that when this potential applied to transistor 18 is subtracted from the potential applied to the base of transistor 17 from the output of the amplifier 16, the desired or prescribed difference is realized. The resulting difference which is the subtraction of the divided output of the amplifier 13 from the output of the amplifier 16, is obtained from the collector of the transistor 18 and is denoted by the luminance signal L.

If, now, a signal of narrower bandwidth as derived from the voltage divider 19,20, is combined with a signal of wider bandwidth as derived from the output of the amplifier 16, contour enhancement is realized in the output signal through such combination in the circuit. This results from the condition that the pulse edges of higher bandwidth become steeper when pulses of lower bandwidth are subtracted therefrom.

It will be understood that each of the elements described above, or two or more together, may also find a useful application in other types of constructions differing from the types described above.

While the invention has been illustrated and described as embodied in a beam splitting system for color television camera, it is not intended to be limited to the details shown, since various modifications and structural changes may be made without departing in any way from the spirit of the present invention.

What I claim as new and desire to be protected by Letters Patent is set forth in the appended claims.

1. In a color television camera having a first, second, and third channel respectively furnishing an electrical luminance signal, and a first and second electrical chrominance signal at a first, second, and third channel output in response to corresponding optical input signals, the gain of said second channel relative to its input signal exceeding the gain of said first channel, a system of compensating for said excessive gain, comprising, in combination, modified beam splitting means receiving light from the scene to be televised and furnishing therefrom, a modified optical luminance signal having an increased percentage of energy in the spectral range of said first chrominance signal, and a first and second optical chrominance signal wherein the energy content of said first optical chrominance signal relative to said second optical chrominance signal has decreased corresponding to said increased percentage in said optical luminance signal, whereby said first, second, and third channel furnish a modified electrical luminance signal and balanced first and second electrical chrominance signals; first circuit means connected to said second channel output for furnishing a correction signal corresponding to a predetermined percentage of said first chrominance signal; and second circuit means connected to said first circuit means and said first channel output for subtracting said correction signal from said modified electrical luminance signal, thereby furnishing a standard electrical luminance signal.

2. A color television camera as set forth in claim 1, wherein said first optical chrominance signal has a spectral range corresponding to the color green.

3. A color television camera as set forth in claim 2, wherein said modified beam splitting means comprise a partially reflecting, partially transmitting first surface for deriving said luminance signal, said first surface having an interference filter for increasing reflected energy in the spectral range corresponding to the color green; and wherein said luminance signal is a reflected signal.

4. A color television camera as set forth in claim 2, wherein said modified beam splitting means comprise a partially reflecting, partially transmitting surface having interference filter means increasing the proportion of spectral energy reflected in the region corresponding to said second chrominance signal, and wherein said optical luminance signal is light transmitted through said surface.

5. A color television camera as set forth in claim 2, further comprising optical focusing means operative in the path between said beam splitting means and said channel inputs for adjusting the resolution of said optical chrominance signals relative to said optical luminance signals.

6. A color television camera as set forth in claim 5, wherein said optical focusing means furnish chrominance signals having a lower resolution than said luminance signals.

7. A color television camera as set forth in claim 2, further comprising first, second and third amplifier means connected, respectively, to said first, second and third channel outputs.

8. A color television camera as set forth in claim 7, wherein the bandwidth of said first amplifier means exceeds the bandwidth of said second and third amplifier means.

9. A color television camera as set forth in claim 2, wherein said first circuit means comprise voltage divider means.

10. A color television camera as set forth in claim 2, wherein said second circuit means comprise differential amplifier means.